United States Patent [15] 3,675,840

Towell [45] July 11, 1972

[54] WIRE CUTTING APPARATUS FOR REFLOW WIRING MACHINES

[72] Inventor: Le Roy Dean Towell, Dallas, Tex.

[73] Assignee: Computer Industries, Inc., Los Angeles, Calif.

[22] Filed: Dec. 15, 1969

[21] Appl. No.: 885,077

[52] U.S. Cl. ....................228/4, 29/484, 29/489, 83/175, 228/47

[51] Int. Cl. ....................B23k 1/00

[58] Field of Search ....................228/3, 4, 5, 51, 52; 30/4 A, 30/273; 83/175; 10/73, 74; 219/56, 243, 209; 29/471.1, 484, 489

[56] References Cited

UNITED STATES PATENTS

| | | | |
|---|---|---|---|
| 3,307,763 | 3/1967 | Rasimenoks et al. | 228/3 |
| 3,314,582 | 4/1967 | Haigler | 228/1 |
| 3,351,103 | 11/1967 | Grainger | 140/112 |
| 3,244,344 | 4/1966 | Folk | 228/44 X |
| 3,091,849 | 6/1963 | Cohen | 29/497.5 X |

*Primary Examiner*—John F. Campbell
*Assistant Examiner*—R. J. Craig
*Attorney*—Jackson & Jones

[57] ABSTRACT

A wire cutting method and apparatus are disclosed for use with a reflow wiring machine for interconnecting selected areas on printed circuit boards. The wire cutting apparatus functions to sever the insulated wire utilized by the reflow wiring machine after a solder joint has been completed. The wire cutting apparatus includes a shaft having a knife edge at its lower extremity positioned adjacent a reflow foot or capillary through which the insulated wire is passed. A knife actuator is connected to the shaft to lower the knife edge into contact with the wire between the solder joint and the reflow foot to sever the wire against the board surface. This results in the formation of a small wire tail located beyond the solder joint and a small wire tail extending below the reflow foot for the initiation of the next solder joint.

6 Claims, 5 Drawing Figures

INVENTOR.
LEROY DEAN TOWELL

BY Jackson & Jones
ATTORNEYS.

WIRE CUTTING APPARATUS FOR REFLOW WIRING MACHINES

BACKGROUND OF THE INVENTION

1. Field of the Invention

The present invention relates to reflow wiring machines for interconnecting selected areas on printed circuit boards, and more particularly to means for cutting the insulated wire utilized by the machines.

2. Description of the Prior Art

Automated production equipment and especially "Numerical-Controlled" (NC) micro-wiring systems have expanded greatly over the past few years. Much improvement has been made, particularly in the degree of reliability of the control of such equipment.

In the field of NC micro-wiring systems, new systems for random interconnection of selected areas on printed circuit boards have made it possible to produce almost any circuit from one basic board layout. One particular NC micro-wiring process which has met with a great deal of success includes means for handling, locating and reflow soldering insulated wire to selected areas on the printed circuit board. Such a process includes a special reflow soldering capillary through which an insulated wire is passed by a wire feed system. An alternating current power supply for selectively heating the capillary is provided. Controlled force is applied to the capillary during the soldering cycle.

In operation, the capillary with insulated wire in place, is brought into contact with a solder-reflow land area on the printed circuit board. The alternating current power supply heats the capillary for a predetermined amount of time. The heat vaporizes the insulation on the wire and causes the solder on the land area to melt and flow around the exposed wire. The heating cycle is terminated for a short duration to assure electrical contact at the solder joint. When the capillary is raised from the board the insulated wire passes through it, enabling the capillary to serve as a wire guide for stringing the wire to subsequent land areas for soldering additional circuit connections for the electrical circuit being formed.

Although such a system operates adequately when a continuous routing is required, the system is not capable of automatically cutting the wire after a solder joint has been completed. The severance of the wire becomes necessary either at the end of the routing or when it is necessary to complete the circuit and start another one on the same board.

SUMMARY OF THE INVENTION

The present invention obviates this shortcoming by providing a novel wire cutting method and novel means for severing the wire utilized by the reflow wiring machines after a solder joint has been completed.

The apparatus includes a shaft having a knife edge at its lower extremity positioned adjacent a reflow foot or capillary. A knife actuator is connected to the shaft to lower the knife edge into contact with the wire between the solder joint and the reflow foot. In the method of operation, after the last solder joint of the string is completed, the board is moved a small amount and the capillary is lowered to crimp the wire tail to prevent it from retracting through the solder foot hole after it is cut. Afterwhich the knife actuator is energized to drive the knife edge against the wire and the board surface, thus severing the wire. This results in the formation of a small wire tail beyond the joint and a small wire tail below the reflow foot for initiating the next solder joint.

An important advantage of the device is that the cutting step instruction can be included in the NC program for the reflow wiring machine, thereby enabling the entire process to be done automatically. Another advantage of the present invention is that since the wire tail is crimped at an angle below the capillary foot before cutting, the crimped tail of the wire will not retract through the capillary hole.

Still another important advantage of the present invention is that all of the severances and wire tails are uniform with the positions of the tails known and fixed.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings.

DESCRIPTION OF THE PREFERRED EMBODIMENT

Figures 1, 2A, 2B, 2C:
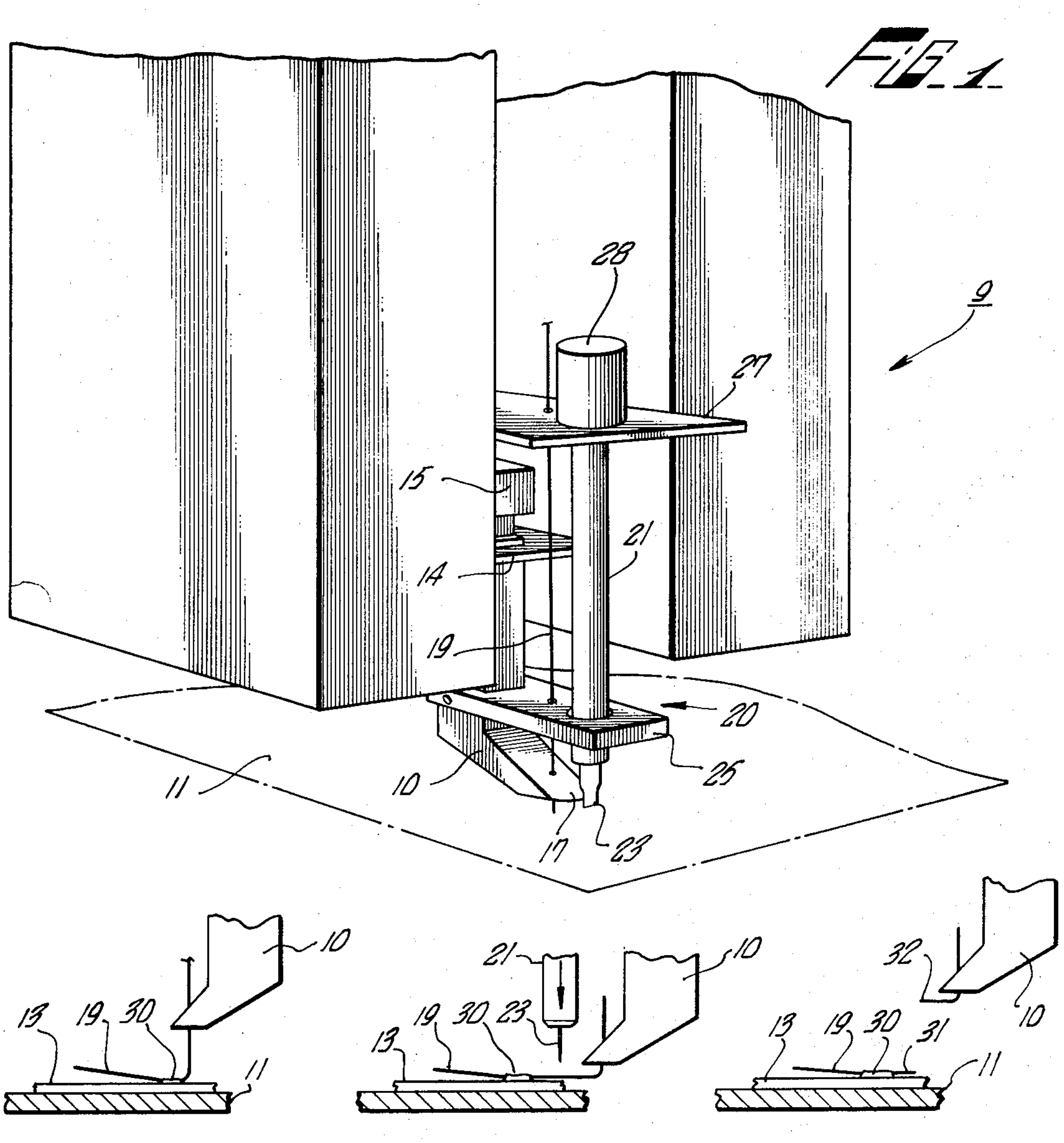
FIG. 1 is a perspective view of the wire cutting apparatus in accordance with the present invention.
FIGS. 2A, 2B, and 2C are schematic views illustrating the operation of the wire cutting system.

Referring to the drawings, FIG. 1 shows a reflow wiring system 9 having a capillary or reflow foot 10 supported over an X-Y table 11 which has a circuit board 13 positioned thereon. The capillary 10 is supported on a shelf 14 which also supports an actuator 15 connected to the capillary 10 for reciprocating the capillary 10. The energizing of the actuator 15 is controlled by an NC programmed control means, although the actuator 15 could also be controlled manually. Capillary 10 includes an aperture 17 for receiving a length of insulated wire 19. The wire support means will be described in greater detail with respect to FIG. 3.

It should be noted that the circuit board is movable in the X-Y axes with its movement controlled by an NC programmed drive means well known in the art. The wire cutting apparatus, shown generally by arrow 20, includes a cylindrical shaft 21 having a knife edge 23 located at the lower extremity thereof and is positioned adjacent the lower extremity of the capillary 10. A guide member 25 is attached to the capillary 10 and includes a bore 26 for receiving and guiding the shaft 21. The shaft 21 is supported on a shelf 27 which also supports an actuator 28, which is adapted to reciprocate the shaft 21. The actuator 28 could also be controlled by an NC programmed control system which could be read into the same NC program as the one controlling actuator 15. It should be noted that the actuators 15 and 28 can either be electrically, hydraulically, or pneumatically driven, or by any other means that is well known in the art.

In operation, the capillary 10 with the insulated wire 19 extending therethrough is brought into contact with a solder-reflow land area on the circuit board 13. An alternating current power supply (now shown) heats the capillary for a predetermined amount of time to vaporize the insulation on the wire and cause the solder on the land area to melt and flow around the exposed wire. Such a solder joint 30 is shown in FIG. 2. For illustrative purposes, the joint 30 shown in FIG. 2A is the last solder joint of the string. After the solder is made, the X-Y table repositions the board a small amount and the capillary 10 is lowered, as shown in FIG. 2B, to crimp the wire 19 to prevent the wire from retracting through the aperture 17. After the capillary 10 is lowered to a position shown in FIG. 2B, the knife actuator 28 is energized to drive the knife edge 23 into contact with the wire 19 to sever the wire against the circuit board surface. Afterwhich the knife edge 23 and the capillary 10 are raised, as shown in FIG. 2C. As a result, a small wire tail 31 is formed beyond the joint 30 and a small wire tail 32 extends below the capillary 10 for the initiation of the next solder joint.

Figure 3:
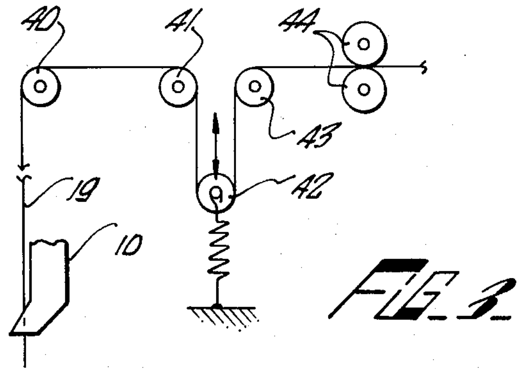
FIG. 3 is a schematic view of the wire tensioning means.

FIG. 3 shows a schematic view of the wire feed system which shows the insulated wire 19 extending from the capillary 10 up around the capstans 40, 41, 42 and 43, through a pair of rollers 44 to a supply spool (not shown). The capstan 42 is resiliently mounted by a spring 45 which enables the capstan 42 to maintain the wire under tension. Maintaining such a tension is important to properly control the stringing of the wire 19 and ensure that it does not fall out of the groove 17 of the capillary 10.

It should be noted that various modifications can be made to the apparatus while still remaining within the purview of the following claims.

What is claimed is:

1. In combination:

capillary means for handling, locating and soldering wire at selected solder reflow areas on a printed circuit board; and wire cutting means for severing a wire against the surface of said printed circuit board adjacent a wire solder joint, said wire cutting means comprising a knife edge reciprocably mounted adjacent said capillary means, said knife edge extending to the surface of said printed circuit board at its lowermost travel, and means for reciprocating said knife edge adjacent said capillary means.

2. The invention of claim 1 wherein said knife edge reciprocating means includes a cylindrical shaft.

3. The invention of claim 2 further comprising actuator means for actuating said reciprocating means, said actuator means comprising a motor connected to said cylindrical shaft.

4. The invention of claim 3 further including programmed actuator control means for automatically controlling the energizing of said actuator means.

5. The invention of claim 5 wherein said programmed actuator control means further includes means for automatically controlling the movement of said capillary means.

6. The invention of claim 1 further including spring-biased wire tensioning means for maintaining the solder wire under tension as it passes through the capillary means.

* * * * *